United States Patent [19]

Billings

[11] 4,173,625
[45] Nov. 6, 1979

[54] HYDROGEN PURIFICATION AND STORAGE SYSTEM

[75] Inventor: Roger E. Billings, Provo, Utah

[73] Assignee: Billings Energy Corporation, Provo, Utah

[21] Appl. No.: 879,044

[22] Filed: Feb. 21, 1978

Related U.S. Application Data

[62] Division of Ser. No. 682,836, May 4, 1976, Pat. No. 4,108,605.

[51] Int. Cl.$^2$ ............................................. C01B 1/32
[52] U.S. Cl. ............................................. 423/648 R
[58] Field of Search ........................... 423/648 R, 644

[56] References Cited

U.S. PATENT DOCUMENTS

| | | | |
|---|---|---|---|
| 2,674,612 | 4/1954 | Murphree | 423/659 G |
| 3,793,435 | 2/1974 | Reilly et al. | 423/644 |

OTHER PUBLICATIONS

Reilly et al., "Formation and Properties of Iron-Titanium Hydride," Inorganic Chemistry, vol. 13, No. 1 (1974), pp. 218-222.

Primary Examiner—O. R. Vertiz
Assistant Examiner—Wayne A. Langel
Attorney, Agent, or Firm—Criddle, Thorpe & Western

[57] ABSTRACT

A method of purifying and storing hydrogen or otherwise separating hydrogen gas from a gaseous mixture containing hydrogen is disclosed. A mixture of hydrogen and other gaseous components is applied under pressure to a hydride container holding a hydride forming material adapted to adsorb at least hydrogen from the gaseous mixture. Cooling of the hydride forming material facilitates adsorption of hydrogen and other gases from the gas mixture. By selectively heating the hydride forming material, following the adsorption step, hydrogen and the other adsorbed gases are selectively released and can, thus, be separated from each other. If hydrogen is the only gaseous component of the gas mixture which is adsorbed during the adsorption step, then substantially pure hydrogen is obtained by heating the hydrogen-loaded hydride material sufficiently to release the purified hydrogen therefrom.

2 Claims, 2 Drawing Figures

HYDROGEN PURIFICATION AND STORAGE SYSTEM

This is a division, of application Ser. No. 682,836 filed May 4, 1976, now U.S. Pat. No. 4,108,605.

BACKGROUND OF THE INVENTION

This invention relates to a system for purifying hydrogen and in particular to such a system in which hydride forming material is utilized to purify hydrogen.

Because of the abundance of hydrogen and its relatively pollution-free burning qualities, the desirability of developing hydrogen as an energy source has long been recognized. Perhaps the principal drawback in utilizing hydrogen thus far has been the difficulty of efficiently and safely storing hydrogen. Storing hydrogen as a liquid is costly, since it requires considerable energy to liquify the hydrogen, and transfer of the liquid from one container to another results in a loss to the atmosphere of much of the hydrogen. Also, containers for liquid hydrogen must be extremely well insulated to reduce loss of hydrogen due to vaporization or boiling. Storing hydrogen as a gas requires extremely heavy and bulky containers and is impractical for most presently contemplated uses.

The use of hydride forming material (hereinafter defined to mean any metals, metal compounds or alloys or other materials capable of adsorbing and holding hydrogen) appears to be an attractive approach to the storage of hydrogen. Exemplary hydride forming material includes iron titanium, misch-metal tetranickel and columbium. Storage of hydrogen in the hydride forming material (to form hydrides by what is sometimes referred to as hydriding) typically involves applying hydrogen gas under pressure to the material and then dissipating the heat generated by the hydriding process. After the material adsorbs the hydrogen, the material is sealed in a container under pressure to maintain the material in the "hydrided" state until the hydrogen is needed at a subsequent time. Recovery or withdrawal of the hydrogen involves a process substantially opposite that used for storing the hydrogen, i.e., releasing some of the pressure of the container in which the hydride is maintained.

Hydride forming material presently contemplated for use in storing hydrogen not only adsorbs hydrogen but also some impurity gases, such as water vapor and oxygen, which are generally present with commercial sources of hydrogen. Some impurity gases are more readily released from the hydride forming material than is hydrogen and some are less readily released. If hydride forming material is repeatedly "charged" with hydrogen and the latter type impurities and then only the hydrogen is released for use, ultimately the hydride forming material will have adsorbed so much impurity gas that it becomes unsuitable for storing hydrogen. Thus, the simple process of repeatedly applying such impure hydrogen to hydride forming material for storage is undesirable since the material eventually becomes incapable of the desired adsorption of hydrogen.

Another problem of storing hydrogen in hydride forming material arises from the fact that most such material is granulated so that a certain amount of void space is present in the material. This can be advantageous in one respect since it facilitates the flow of hydrogen through the material during the hydriding process, but disadvantageous in anothr respect since the voids receive and retain the impurities present with the hydrogen which are not adsorbed. Of course, it would be desirable to purge the impurities from the voids prior to supplying the hydrides to users since the presence of such impurities might be detrimental to the intended use.

SUMMARY OF THE INVENTION

It is an object of the present invention to provide a simple, inexpensive and efficient system for purifying and storing hydrogen.

It is also an object of the present invention to provide such a system wherein little hydrogen is wasted during the process of storing the hydrogen.

It is a further object of the present invention, in accordance with one aspect thereof, to provide such a system which utilizes hydride forming material to purify the hydrogen and wherein the hydride forming material may be repeatedly used with little diminishment of its hydrogen adsorbing abilities.

The above and other objects of the present invention are realized in an illustrative hydrogen purification system in which a mixture of hydrogen and impurities is applied to a container holding hydride forming material capable of adsorbing hydrogen and impurities, of releasing hydrogen at one temperature and pressure, and of releasing the impurities at another temperature and pressure. After hydrogen and impurities are adsorbed by the hydride forming material in the container, the temperature and pressure in the container are controlled to enable release of the hydrogen from the material but to prevent release of at least certain of the impurities. The released hydrogen is then delivered to a utilization unit (second container, hydrogen fueled engine, etc.). The hydrogen delivered to the utilization unit is substantially purged of certain unwanted impurities.

This purification and delivery process may be continued until the hydride material in the container reaches a point where it has adsorbed so much impurity gas as to lower its hydrogen adsorbing capability by some predetermined amount. When this point is reached, either the hydride container may be discarded or the temperature and pressure in the hydride container controlled so that at least certain of the impurities are released from the hydride material and from the container. In the latter case, the container would then be ready to once again perform its impurity purging function. In this manner, impurities which tend to be adsorbed by hydride material but which are not readily released under the same conditions as is hydrogen are first removed from the hydrogen/impurity mixture so that relatively impurity free hydrogen may be passed to and used by another unit.

In accordance with one aspect of the invention, a second container holding hydride forming material is attached to the first mentioned container to receive hydrogen released from the first container. After the second container has been "charged" with hydrogen, some of the adsorbed hydrogen is released to purge from the voids in the hydride forming material impurities which may not have been removed in the first container nor adsorbed in the second container. The second container thus contains reasonably pure hydrogen.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

In a simple embodiment of the present invention, a hydride bed or container 4 (FIG. 1) is coupled in series between an impure hydrogen source 16 and a hydrogen utilization unit 12. Obviously, the hydrogen source 16 is not purposefully made impure, but practically it is difficult to obtain hydrogen which does not contain impurities. The hydrogen utilization unit 12 might illustratively be another hydride container, a hydrogen burning engine, etc. A mixture of hydrogen and impurity gases is delivered by the source 16 to the hydride container 4 where the more reactive impurities are adsorbed by the hydride forming material in the container. The partially purified mixture is then conveyed to the utilization unit for either storage or direct use. Exemplary impurities which could be removed from the mixture by simply passing the mixture through the container 4 include chlorine gas and fluorine gas.

For these particular impurities and other highly reactive impurities, it may be impractical to attempt to recover and reuse the hydride forming material by driving off the impurities from the material. In such a case, the hydride container 4 (or just the hydride forming material therein) would be thrown away after the hydride forming material had adsorbed some predetermined amount of impurities, i.e., when the material became so saturated with impurities that it could no longer readily function to adsorb additional impurities.

Figure 1:
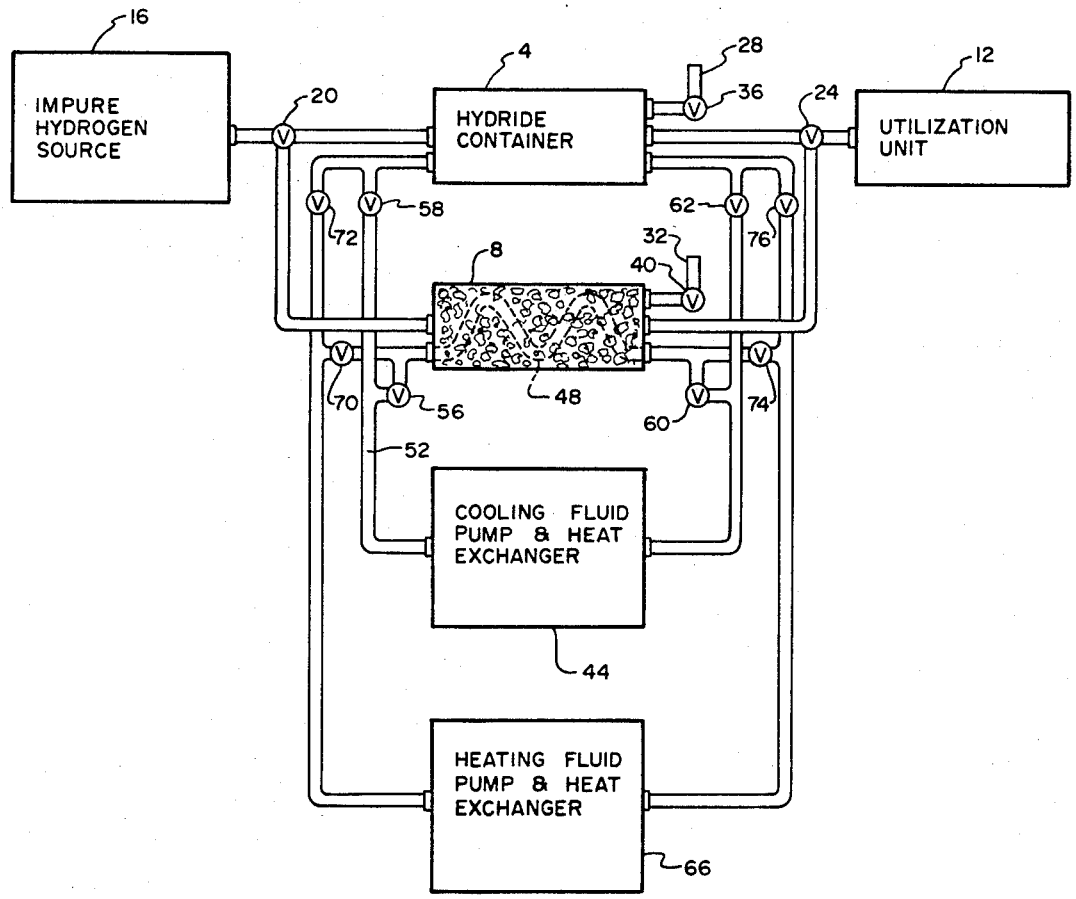
FIG. 1 is a diagram of one illustrative embodiment of a hydrogen purification system made in accordance with the principles of the present invention.

A more complicated embodiment of the present invention will now be described in connection with FIG. 1. This embodiment is for use in removing impurities which, although less readily released from hydride forming material (once adsorbed) than is hydrogen, nevertheless may be released from the material by taking appropriate measures such as heating the material. In this embodiment, a second hydride container 8 is coupled in parallel with the hydride container 4. The impure hydrogen source 16 is coupled by way of a control valve 20 to the hydride containers 4 and 8 and the hydride containers, in turn, are coupled to the hydrogen utilization unit 12 by way of a control valve 24. The control valve 20 operates to direct hydrogen and impurities from the source 16 either to the hydride container 4, the hydride container 8 or to both, and the control valve 24 operates to direct hydrogen from either the container 4 or the container 8 to the utilization unit 12 or from both containers 4 and 8 to the unit 12. Such bi-directional valves are well known in the art.

Both hydride containers 4 and 8 include outlets 28 and 32 and outlet valves 36 and 40 respectively. These outlets and valves simply control the release of gases from the hydride containers into the atmosphere. These outlets and valves are provided so that impurity gases adsorbed by the hydride material in the containers 4 and 8 can, from time to time, be driven off as will be explained shortly. This allows use and reuse of the containers 4 and 8 and the hydride forming material therein.

To facilitate both adsorption and release of hydrogen and impurities from the hydride forming material in the hydride containers 4 and 8, a cooling fluid pump and heat exchanger 44 and a heating fluid pump and heat exchanger 66 are provided. The heat exchanger 44 supplies cooling fluid to coil conduits 48 disposed in the containers 4 and 8 (shown by dotted line only in container 8 of the drawing). The cooling fluid is supplied by the pump and heat exchanger 44 to a conduit 52 and then directed by control valves 56 and 58 to the coil conduits in either container 4, container 8, or both. The cooling fluid flows through the container conduits 48 through control valves 60 or 62 back to the pump and heat exchanger 44. In a similar manner, heating fluid from the pump and heat exchanger 66 is conveyed via control valves 70 and 72 either to container 4, or container 3, or both, and from the hydride containers via control valves 74 and 76 back to the pump and heat exchanger 66. Thus, both cooling fluid and heating fluid may be conveyed into proximity with the hydride forming material held in the containers. Although a very simple hydride container is shown in the drawing, it should be understood that any one of a variety of different type hydride containers could be devised and arranged generally in the arrangement shown in the drawing. Exemplary hydride containers are disclosed in copending application, Ser. No. 570,268.

The cooling fluid from the pump and heat exchangers 44 is used to facilitate adsorption of both hydrogen and impurities by the hydride forming material held in the containers 4 and 8, and the heating fluid from the exchanger 66 is used to facilitate release of either hydrogen or the impurities. The cooling fluid is applied by the pump and heat exchanger 44 to the container conduits 48 to adsorb and carry away heat produced by the hydride forming material during the adsorption process. The heating fluid is applied by the pump and heat exchanger 66 to the container conduits 48 to heat the hydride forming material to various temperatures to thereby induce release of either the hydrogen or the impurities held by the material. This will become very clear with further description of the operation of the system.

Impure hydrogen from the source 16 is applied under pressure via the control valve 20 to the hydride container 4. As indicated earlier, the hydrogen source 16 is not purposefully made impure but practically, it is difficult to secure hydrogen which does not include some "impurities." As the mixture of hydrogen and impurities is applied to the hydride container 4, cooling fluid is circulated through conduits in the container by the pump and heat exchanger 44 to facilitate adsorption of the hydrogen and impurities by the hydride forming material in the container. The rate at which the hydrogen and impurities are adsorbed is dependent upon both the pressure under which the mixture is applied to the container and the temperature of the hydride forming material. The lower the temperature and greater the pressure, the faster is the rate of adsorption and the greater is the amount which would be adsorbed. While the mixture is being applied to the hydride container, control valve 24 is closed as is outlet control valve 36.

After the hydride forming material in the container 4 has adsorbed hydrogen and impurities, the control valve 20 is operated to direct mixture from the source 16 to the hydride container 8. Control valve 58 is operated to prevent further supply of the cooling fluid to the hydride container 4, control valve 56 is opened to allow cooling fluid to flow to the conduit 48 of the container 8, control valve 70 is closed, and control valve 72 is opened to allow flow of heating fluid to the conduit in the hydride container 4. Control valves 60, 62, 74 and 76 are similarly operated to direct heating fluid from the hydride container 4 back to the heating fluid pump and heat exchanger 66 and to direct cooling fluid from the hydride container 8 back to the cooling fluid pump and heat exchanger 44. With cooling fluid flowing to the container 8, the hydride forming material held therein adsorbs hydrogen and impurities from the mixture supplied by the source 16. With heating fluid being supplied to the hydride container 4, the hydride forming material is induced to release hydrogen which flows through control valve 24 to the utilization unit 12. The temperature of the heating fluid from the heat exchanger 66 is maintained at a level just sufficient to induce the release of hydrogen, but not those impurities which are less readily released than is hydrogen. Thus, principally only hydrogen is allowed to flow from the container 4 into the utilization unit 12.

When the hydrogen previously adsorbed by the hydride material in the container 4 has been transported to the utilization unit 12, and when the hydride forming material in the container 8 has adsorbed hydrogen and impurities, the control valves are operated so that mixture from the source 16 is again directed to the container 4, so that cooling fluid is directed to the conduit 48 in the container 4, and so that heating fluid is directed to the conduit 48 in the container 8. The hydride forming material in the container 4 thus again is induced to adsorb hydrogen and impurities and the hydride forming material in the container 8 is induced to release principally only hydrogen for transfer to the utilization unit 12.

If the utilization unit 12 were a hydride container, then when the container was sufficiently charged with substantially pure hydrogen, it would be removed from the system and a new hydride container would be attached in its place. In this fashion, substantially pure hydrogen can be supplied to and stored in hydride containers for later use.

After the hydride forming material in the hydride containers 4 and 8 successively adsorbs hydrogen and impurities and releases hydrogen, the impurities in the material will, of course, build up and thus reduce the capability of the material to adsorb more impurities or hydrogen. When the hydride forming material has adsorbed some predetermined quantity of impurity gases, heating fluid is supplied by the pump and heat exchanger 66 to the containers at a temperature considerably higher than the temperature maintained for inducing release of only the hydrogen and at this latter temperature, the hydride forming material is induced to release the impurities previously adsorbed. During this process, valves 36 and 40 are opened to release the impurities into the atmosphere or suitable waste sink (not shown). By heating the hydride forming material to a sufficiently high temperature, the material in the containers is purged of the impurities and may again be used for adsorbing hydrogen and impurities and for releasing hydrogen as previously described.

The temperatures and pressures at which impurities and hydrogen would be adsorbed and released from the hydride forming material depends upon the impurities of interest and the hydride forming materials used. These temperatures and pressures can be readily determined by experiment. It has been found, for example, that iron titanium adsorbs and releases hydrogen at room temperature (about 72° F.) and so much adsorption and release can be controlled by controlling the pressure in the hydride containers—increase in pressure induces adsorption of hydrogen and decrease in pressure induces release of hydrogen. To release impurities, the temperature of the iron titanium is simply increased until the impurities are driven off.

It should be understood that certain impurities may be adsorbed and released by hydride forming material under substantially the same circumstances as with hydrogen. Such impurities are not of concern in the present invention since the concern is removal of impurities which are not readily released from hydride material but rather which build up in the hydride material to hamper or inhibit adsorption of hydrogen (embodiment of FIG. 1) and impurities which are not as readily adsorbed as is hydrogen (embodiment of FIG. 2 to be discussed momentarily). By employing the system and method of FIG. 1, certain undesirable impurities are first removed from the hydrogen before it is applied to the utilization unit 12 so that the utilization unit is not adversely affected by the impurities.

Figure 2:
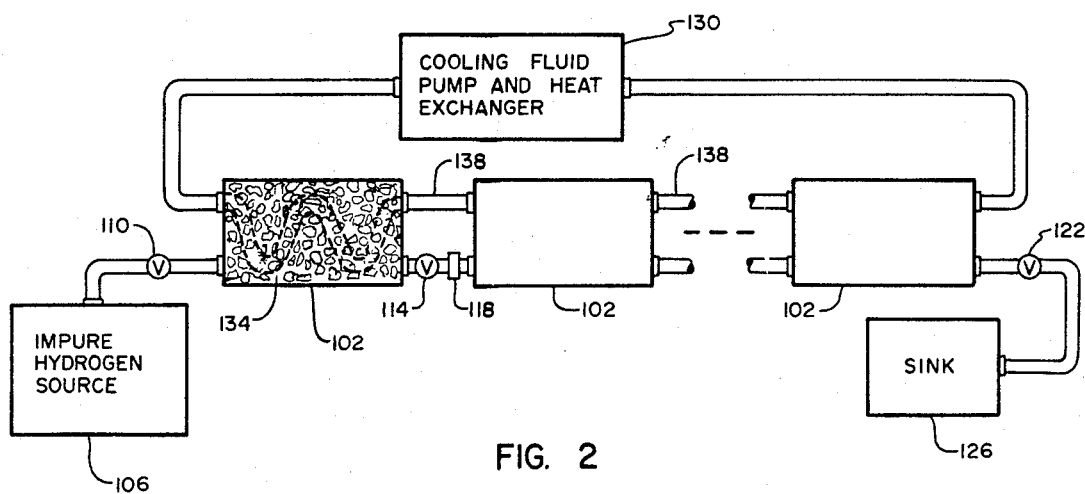
FIG. 2 is a diagram of another illustrative embodiment of a hydrogen purification system also made in accordance with the principles of the present invention.

The embodiment of the present invention shown in FIG. 2 is designed to remove impurities which are less readily adsorbed than is hydrogen. As shown in FIG. 2, hydride containers 102 are coupled in a series or cascaded relationship which, as will become clear as the description continues, facilitates purification and storage of hydrogen with very little loss of hydrogen.

A source of impure hydrogen gas 106 is coupled via a control valve 110 into one end of the first hydride container 102 of the series of containers. The other end of the first container is coupled by way of a control valve 114 and a check valve 118 into one end of the second container of the series and so on. The last hydride container in the series is coupled by way of a control valve 122 to a waste sink 126. With this arrangement, hydrogen plus whatever impurities are present flow from the source 106 through the first hydride container in the series and then successively through the remaining containers to the sink 126.

To facilitate adsorption of hydrogen by the hydride material held in the containers 102, a source of cooling fluid is provided to adsorb and carry away heat produced by the hydride material during the hydriding process. Thus, a cooling fluid pump and heat exchanger 130 is coupled to the first and last container in the series to coil conduits 134 (shown by dotted line in FIG. 1) disposed in the containers. Each of the coil conduits 134 is also coupled by way of connecting conduits 138 to similar coil conduits in adjacent containers. In this manner, cooling fluid is conveyed into proximity with the hydride material held in the containers.

Impure hydrogen from the source 106 is applied under pressure via the control valve 110 to the first hydride container 102 of the series. The mixture of hydrogen and impurities flow through the first container during which time some of the hydrogen is adsorbed by the hydride forming material in the container, and then through control valve 114 and check valve 118 into the second container in the series. (This, of course, assumes that the impurities in question here are not as readily adsorbed as is hydrogen. Examples of such impurities are nitrogen and argon.) Because some of the hydrogen of the mixture was adsorbed in the first container, the mixture flowing from the first container to the second container will have a higher concentration of impurities than the mixture applied to the first container. Still more hydrogen is adsorbed in the second container and thus additionally diluted mixture is passed to the third container in the series, etc.

To maintain the flow of mixture from the source 106 to the sink 126, the control valves 110, 114, . . . and 122 are operated to control the flow of mixture therethrough and maintain the pressure of the mixture in the first container higher than the pressure in the second container which, in turn, is maintained higher than the pressure in the third container, etc. Of course, the control valves 110 through 122 are proportional valves to provide variable flow of the mixture from one container to the next. Maintaining the pressure in this fashion not only facilitates the flow of the mixture through the series of containers but also enhances the speed at which hydrogen is adsorbed by the hydride forming material in the containers. The check valves 118 in the conduits connecting the containers prevent the backflow of mixture.

The cooling fluid is pumped from the unit 130 to the hydride containers and through the coil conduits 134. As the cooling fluid passes through the hydride containers, it adsorbs heat produced during the hydriding process.

When the hydride forming material in the first container has adsorbed a certain amount of hydrogen, the control valve 110 is closed to prevent further application of mixture to the container. At this point, mixture (including hydrogen and impurities) would remain in the voids among the granular hydride forming material. To eliminate the impurities from the first container, the hydride forming material in the container is induced to release some of the hydrogen and the control valve 114 is operated to allow the released hydrogen to force the mixture from the first container to the second container in the series. The amount of hydrogen so released would depend upon the void space volume but, in any case, it would generally be only a small percentage of the total amount of hydrogen adsorbed and held in the hydride forming material. This is so since most hydride forming material adsorbs many times its volume in hydrogen.

After the impurities are purged from the first container in the series, either the container itself could be removed from the series arrangement or the hydrogen in the container could be removed depending upon the use to which the hydrogen was to be put. If the containers were removed, advantageously a new container would be inserted at the end of the series between what was initially the last container in the series and the sink 126. The source 106 would then be connected to what initially was the second container in the series, and the purification process would be continued.

Because hydrogen is adsorbed by the hydride forming material in each container as the mixture of hydrogen and impurities passes from the source 106 through each of the containers in series, the mixture ultimately passing into the sink 126 contains mostly impurities and very little hydrogen. Thus, the mixture applied to the sink 126 could simply be vented or discharged and very little loss of hydrogen would result. The system and method described in FIG. 2 thus provides for obtaining substantially pure hydrogen with very little resultant hydrogen loss.

Although three different embodiments of the present invention have been described separately, it should be understood that any combination of the embodiments could be provided to cooperate in removing the various impurities. For example, the system of FIG. 2 could be coupled in series downstream of the system of FIG. 1. That is, the input to the first hydride container 102 in the series of FIG. 2 could be coupled to the output of valve 24 of FIG. 1. With this arrangement, the FIG. 1 portion of the combination would serve to remove the more highly reactive impurities and the FIG. 2 portion would serve to remove impurities which are less readily adsorbed than is hydrogen.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of separating a hydrogen enriched gas from a gas mixture containing hydrogen and other gaseous components, comprising
    (a) supplying said gas mixture to a hydride container having a hydride forming material therein which is adapted to adsorb hydrogen gas from said gas mixture,
    (b) venting unadsorbed gaseous components of said gas mixture from said hydride container,
    (c) treating the hydrogen-loaded hydride material in said hydride container to desorb and release a hydrogen enriched gas therefrom, by controlling the temperature of said hydride forming material and the pressure in said hydride container so that hydrogen is released from said hydride forming material with substantially none of the other gaseous components which may have been adsorbed by said hydride forming material being released,
    (d) delivering the hydrogen enriched gas from said hydride container to a hydrogen utilization unit,
    (e) heating said hydride forming material to a second temperature greater than the controlled temperature of step (c) while maintaining the pressure in said hydride container at least no greater than the controlled pressure of step (c) to cause other gaseous components which may have been adsorbed by said hydride forming material to be released therefrom, and
    (f) releasing said other gaseous components from said hydride container.

2. A method in accordance with claim 1, wherein step (a) further comprises controlling the temperature of said hydride forming material by cooling said material to remove heat generated when hydrogen and any other gaseous components are adsorbed by said material.

* * * * *